United States Patent [19]

Wörner et al.

[11] Patent Number: 5,180,408
[45] Date of Patent: Jan. 19, 1993

[54] DEVICE FOR TREATING THE EXHAUST GASES OF INTERNAL COMBUSTIN ENGINES WITH TWO EXHAUST GAS TREATMENT BODIES ARRANGED AT SPACED LOCATIONS

[75] Inventors: Siegfried Wörner, Esslingen-Berkheim; Georg Wirth, Kirchheim/Teck; Peter Zacke, Albershausen, all of Fed. Rep. of Germany

[73] Assignee: J. Eberspacher, Esslingen, Fed. Rep. of Germany

[21] Appl. No.: 815,941

[22] Filed: Dec. 30, 1991

[30] Foreign Application Priority Data

Dec. 31, 1990 [DE] Fed. Rep. of Germany ....... 4042266

[51] Int. Cl.⁵ .............................................. B01D 46/00
[52] U.S. Cl. ...................................... 55/482; 55/523; 55/DIG. 30; 422/171; 422/177
[58] Field of Search ................... 422/171, 177; 55/523, 55/DIG. 30, 482

[56] References Cited

U.S. PATENT DOCUMENTS 4,239,733 12/1980 Foster .................................. 422/171
4,256,700 3/1981 Smith et al. .......................... 422/177

FOREIGN PATENT DOCUMENTS 3531807 3/1987 Fed. Rep. of Germany ...... 422/177

*Primary Examiner*—Bernard Nozick
*Attorney, Agent, or Firm*—McGlew and Tuttle

[57] ABSTRACT

Device for the catalytic detoxification of or soot removal from exhaust gases of internal combustion engines, comprising: a housing (4) which has two partial shells (4a, 4b) welded together along longitudinal welded edge pairs (26) and two open end zones (8) connected to an exhaust gas line, as well as a flow passage for the exhaust gas between the end zones. Two exhaust gas treatment bodies (6) are provided through which gas is able to flow. The exhaust gas treatment bodies are arranged one behind the other in the flow direction and are arranged at spaced locations from one another in the housing. A protective ring (14) made of sheet metal is provided which delimits the space between the two exhaust gas treatment bodies (6) on the outside. The protective ring (14) has at least one sheet metal flap (32), which extends between a welded edge pair (26) of the housing partial shells (4a, 4b) and is welded to the housing (4) at the welded edge pair.

16 Claims, 2 Drawing Sheets

DEVICE FOR TREATING THE EXHAUST GASES OF INTERNAL COMBUSTIN ENGINES WITH TWO EXHAUST GAS TREATMENT BODIES ARRANGED AT SPACED LOCATIONS

FIELD OF THE INVENTION

The present invention pertains to a device for the catalytic detoxification of or soot removal from exhaust gases of internal combustion engines, including:

a) a housing which is composed of two partial shells welded together along welded edge pairs and has two open end zones connected to an exhaust gas line, as well as a flow passage for the exhaust gas between the end zones;

b) two exhaust gas treatment bodies through which exhaust gas is able to flow and which are arranged one behind the other in the flow direction and at spaced locations from one another in the housing; and c) a protective ring made of sheet metal, which delimits on the outside the space between the two exhaust gas treatment bodies.

BACKGROUND OF THE INVENTION

Such a device has been known from West German Offenlegungsschrift No. DE-OS 36,26,728 for the case of catalytic exhaust gas detoxification. The protective ring is consistently round and is held in the housing by means of a holding mat, which also holds the two exhaust gas treatment bodies in the housing. The problem arises here that the protective ring is not always (under all occurring states of operation) held securely against displacement or tilting. In addition, accurate mounting of the holding ring by placing it into a partial shell of the housing and subsequently putting in place and welding the second partial shell is associated at least with a very substantial amount of work.

SUMMARY AND OBJECTS OF THE INVENTION

It is an object of the invention to provide a device for treating exhaust gases of internal combustion engines by providing two exhaust gas treatment bodies arranged at spaced locations wherein a central protective mounting ring is accurately positioned in the housing in a simple manner with correct alignment.

Still another object of the invention is to provide a device for treating exhaust gases of internal combustion engines which is simple in design, rugged in construction and economical to manufacture.

According to the present invention a protective ring is provided having at least one sheet metal flap which extends between a welded edge pair of the housing partial shells and is welded to the housing there.

The present invention solves the problem of accurately mounting the protective ring in the housing in a simple manner and in correct alignment. During mounting, the sheet metal flap extending between the welded edge pair ensures, quasi automatically, alignment of the protective ring corresponding to the longitudinal extension of the housing; tilting or canting of the protecting ring is ruled out. In addition, secure fixation of the protective ring in the circumferential direction is achieved. Due to the sheet metal flap being welded to the housing, the protective ring is securely fixed and aligned after mounting during the operation of the device.

At spaced locations in the circumferential direction, preferably essentially at diametrically opposite locations, the protective ring has two sheet metal flaps, each of which extends between a welded edge pair of the housing partial shells and is welded to the housing there. This measure further facilitates mounting of the protective ring and makes the fixation and the alignment of the protective ring more secure.

According to a preferred variant of the present invention, the sheet metal flap of the protective ring received in a depression of the welded edge pair. As a consequence of this measure, the protective ring will assume its desired position quasi automatically during mounting. If, as is preferable, the depression has a width, measured in the longitudinal direction of the housing, which is adapted to the sheet metal flap width measured in the longitudinal direction of the housing, positive-locking fixation of the protective ring against movements in the longitudinal direction of the housing is achieved. For each sheet metal flap, the depression may be present in either one welded edge or both welded edges of the corresponding welded edge pair.

The protective ring can be manufactured in a particularly favorable manner if it consists of two partial protective rings joining one another in the circumferential direction, with two partial sheet metal flaps at the ends. The two partial protective rings may be connected to one another prior to mounting the protective ring in the housing, preferably by spot welding, but they may also be united to form the united protective ring only at the time of welding the partial sheet metal flaps to the welded edges.

According to another preferred possibility, the protective ring—especially if it has only one sheet metal flap, which may also be formed by two partial sheet metal flaps—is in positive-locking engagement, at a point located at a spaced location from the sheet metal flap in the circumferential direction, with a connection piece for a lambda probe. This connection piece extends into the interior of the housing. The advantages in terms of mounting and fixation are maintained as a consequence of the sheet metal flap. At the point, that is preferably essentially diametrically opposite the sheet metal flap, the protective ring is securely fixed due to engagement with the connection piece.

In those areas in which no sheet metal flap and possibly no engagement with a connection piece extending into the interior of the housing is present, the protective ring preferably has one bead or, next to one another, a plurality of beads. When considering their length in the circumferential direction, the beads need not exactly reach the sheet metal flap or the connection piece, but may end somewhat before them. In addition, beads need not be present in all the above-mentioned areas. The beads may be embossed radially to the outside or radially to the inside.

The front view of the protective ring may be essentially triangular with rounded corners and may have two sheet metal flaps at two corner zones. Alternative geometries are round protective rings or oval protective rings.

The two exhaust gas treatment bodies are preferably held in the housing by means of a continuous holding mat, preferably an expanding mat, and a silicate fabric layer is provided on the inside of the holding mat for the two transition zones where the protective ring is adjacent to the two exhaust gas treatment bodies.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENT

Figure 1:
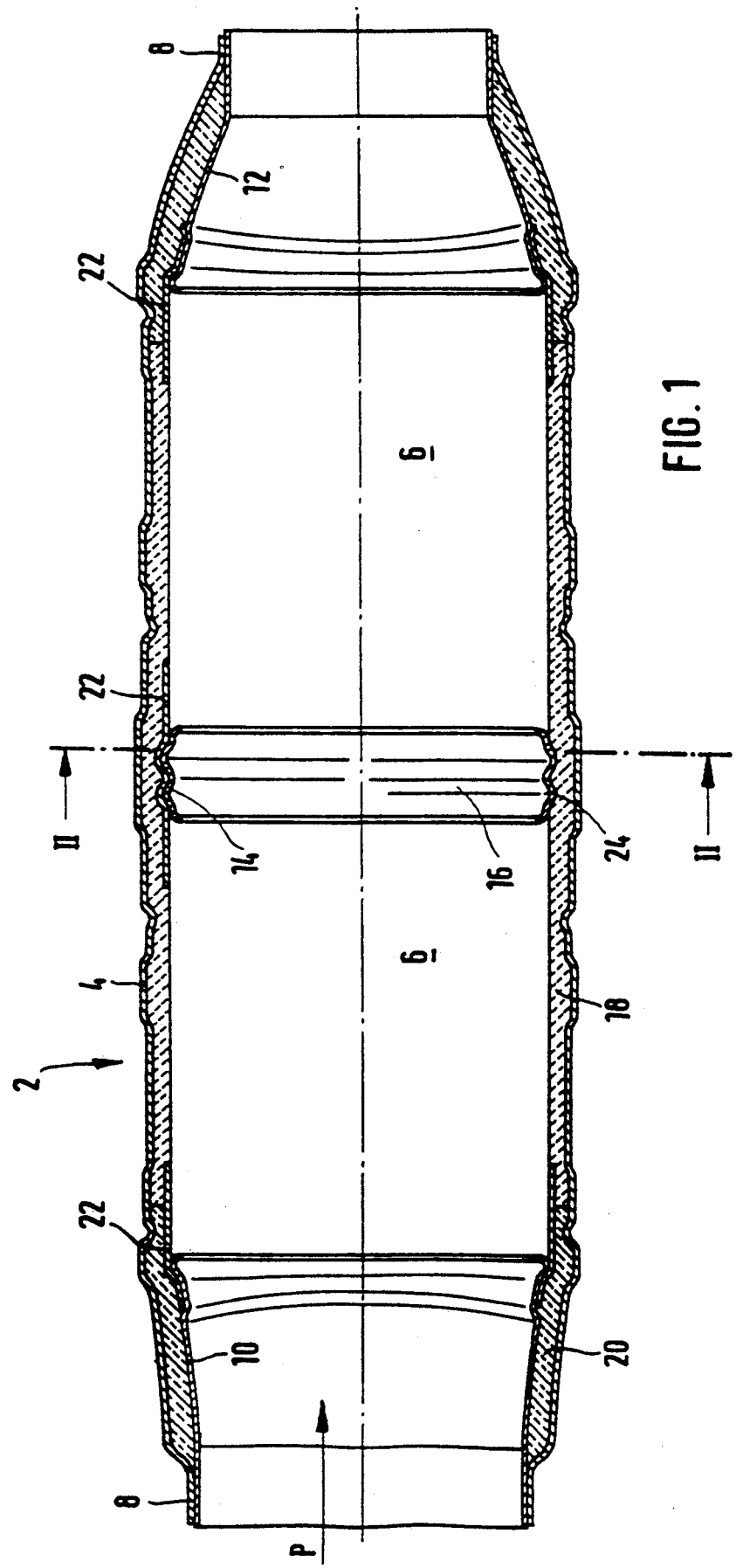
FIG. 1 is a longitudinal sectional view of a device for the treatment of exhaust gases of internal combustion engines.

The device 2 shown in FIG. 1 has an external housing 4 in which two exhaust gas treatment bodies 6 are arranged one behind the other in the longitudinal direction aligned with and at spaced locations from one another. To the left of the exhaust gas treatment bodies 6 and to the right of the exhaust gas treatment bodies 6 in FIG. 1, the housing tapers toward circular end zones 8. An intake funnel 10 extends from the left end zone 8 to a short distance in front of the left end face of the left-hand exhaust gas treatment body 6. A discharge funnel 12 extends from the right end zone 8 to a short distance in front of the right end face of the right-hand exhaust gas treatment body 6. The intake funnel 10 and the discharge funnel 12 are each fastened to the housing in the end zone 8. In the space between the two treatment bodies 6, there is a protective ring 14 made of sheet metal which extends to a short distance in front of the end faces of the two treatment bodies 6 located there. At their end facing a treatment body 6, the intake funnel 10, the protective ring 14, and the discharge funnel 12 have a size that is slightly smaller than the size of the corresponding treatment body 6.

In its two end zones 8, the device 2 may be connected, e.g., welded, to an exhaust gas line, not shown. The exhaust gas line carries exhaust gases of an internal combustion engine during operation. In the housing, there is a flow passage for an exhaust gas stream corresponding to the arrow P, which leads through the intake funnel 10, the left-hand treatment body 6, the space 16, the right-hand treatment body 6, and the discharge funnel 12.

The two treatment bodies 6 are held in the housing 4 by means of a common, longitudinally continuous holding mat 18. The holding mat is preferably a commercially available, so-called expanding mat whose volume increases with increasing temperature in order to thus hold the treatment bodies 6 securely, even if the housing 4 expands substantially more strongly during operation because of the high exhaust gas temperatures than do the treatment bodies 6. On the left, the holding mat 18 does not quite reach the left end of the left-hand treatment body 6, and, on the right, it does not quite reach the right end of the right-hand treatment body 6.

One annular space each, which is filled with an insulating mat 20, is present, not only in the respective end zone 8, between the intake funnel 10 and the housing 4, but also between the discharge funnel 12 and the housing 4. The insulating mats 20 extend to the holding mat 18. The insulating mats 20 consist of, e.g., ceramic fibers.

In the state as manufactured, there is a short distance in each case between the right end of the intake funnel and the left end of the left-hand treatment body 6; between the right end of the left-hand treatment body 6 and the left end of the protective ring 14; between the right end of the protective ring 14 and the left end of the right-hand treatment body 6; and between the right end of the right-hand treatment body 6 and the left end of the discharge funnel 12. These distances are bridged over on the circumference by a total of three protective layers 22. The protective layers 22 are in contact, with their inner sides, with the intake funnel 10 and a treatment body 6 and the protective ring 14 and on the discharge funnel 12 and are surrounded on their outsides by the respective insulating mat 20 or the holding mat 18, and are therefore pressed in the inward direction against the described components of the device. The middle protective layer 22 bridges over both the gap to the left of the protective ring 14 and the gap to the right of the protective ring 14. The protective layers 22 preferably consist of silicate fabric.

The protective ring 14 has two beads 24 which are embossed radially outwardly and extend circumferentially in parallel to one another. The beads 24 stiffen the protective ring 14, and the outer contour, which has a corrugated longitudinal section. This serves to ensure more secure fixation against axial movement by means of the holding mat 18.

Figure 2:
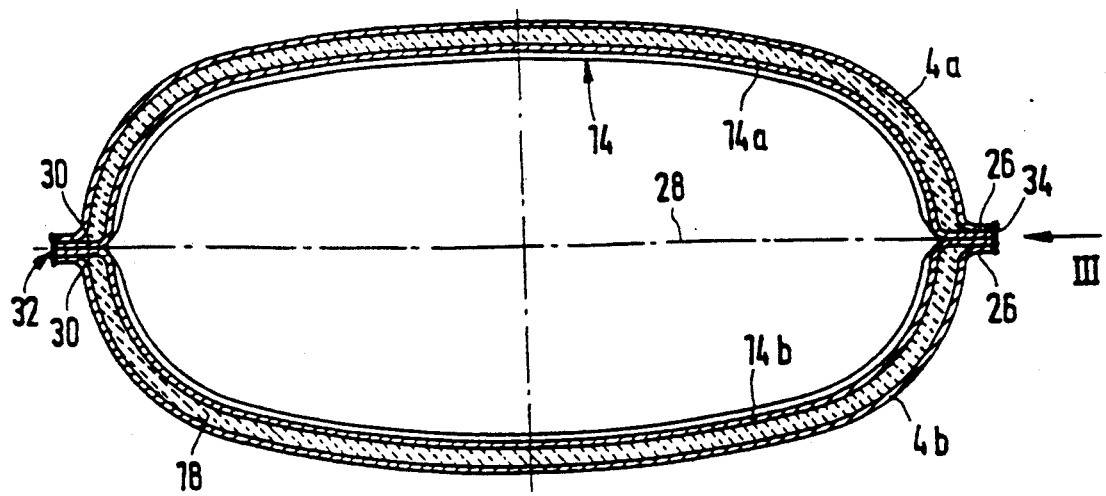
FIG. 2 is a cross sectional view of the device according to FIG. 1 taken along line II—II of FIG. 1.
Figure 3:
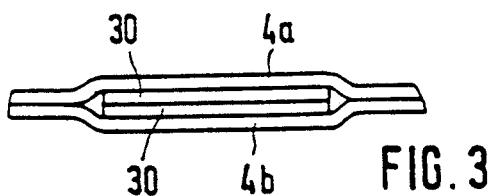
FIG. 3 is a side view of a detail of the device according to FIGS. 1 and 2 in the direction of arrow III.

As is apparent from FIG. 2, the housing 4, the protective ring 14, and the two treatment bodies 8 have oval cross sections. However, other cross section geometries, especially circular, triangular with rounded corners (FIG. 4), may also be considered. FIG. 2 also shows that the housing consists of an upper housing partial shell 4a and a lower housing partial shell 4b. Each of the housing partial shells 4a and 4b has—if viewed in the direction of FIG. 2—an outwardly bent welded edge 26 each to the left and right. The protective ring 14 is composed of an upper partial protective ring 14a and a lower partial protective ring 14b. Each of the two partial protective rings 14a and 14b has an outwardly bent partial sheet metal flap 30 essentially in the plane of division 28 of the housing 4. In the right-hand part of FIG. 2, the two partial sheet metal flaps 30 of the two partial protective rings 14a and 14b are spot-welded to a sheet metal flap 32. This is also true of the left-hand side of the protective ring. In the area in which the protective ring 14 is located, the welded edges 26 of the upper housing partial shell 4a have a local depression produced by upward bending. In this area, the welded edges 26 of the lower housing partial shell 4b have a local depression produced by downward bending. Thus, a pocket-like space, which accommodates the corresponding sheet metal flap 32, is formed there between the left-hand welded edge pair 26 and the right welded edge pair 26. The sheet metal flap 32 extends to the outside as far as the welded edge pair. After assembly of the device, the housing partial shells 4a, 4b and the protective ring 14 are welded together along the welded edge pairs 26, as is indicated by the welding beads 34. FIG. 3 shows the state prior to welding. The protective layer 22 is omitted in FIG. 2 for clarity's sake. It is indicated in the lower part of FIG. 1 that the device 2 may also be built without the middle protective layer 22 associated with the protective ring 14. The beads 24 end shortly in front of the partial sheet metal flaps 30, so that the partial sheet metal flaps 30 are flat.

Especially in the case of devices 2 with relatively small cross sections and/or round cross sections, it is also possible to operate with one protective ring 14, which has a sheet metal flap 32 on one side only.

Figure 4:
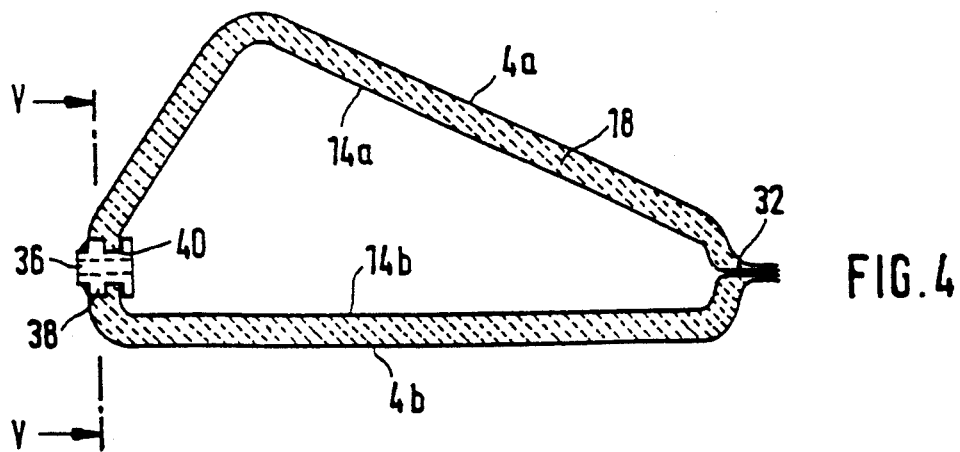
FIG. 4 is a cross sectional view, similar to that in FIG. 2, of another embodiment of the device.
Figure 5:
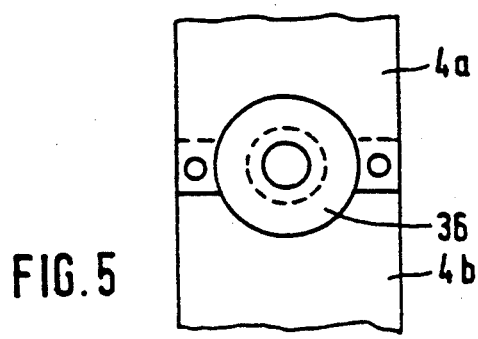
FIG. 5 is a partially cutaway side view according to V—V of FIG. 4 showing a detail of the device according to FIG. 4.

FIGS. 4 and 5 show an embodiment in which the device has a cross section of triangular configuration with rounded corners. The protective ring 14 has a sheet metal flap 32 on one side only, and this sheet metal flap 32 is again formed by two partial sheet metal flaps 30. Essentially diametrically opposite the sheet metal flap 30, the protective ring 14 engages, in a positive-locking manner, a connection piece 36, which extends into the interior of the housing 4, passing through the housing 4, the holding mat 18, and the protective ring 14. The connection piece 36, which is annularly welded to the housing 4 on the outside, is used to insert a lambda probe, not shown, which extends into the space 16. The connection piece 36 has an annular projection 38, which is in contact with the housing 4 from the inside. An annular groove 40, which the protective ring 14 engages, is provided in the outer circumference of the connection piece 36 on the inside next to the annular projection 38.

FIG. 5 shows a possibility of composing the protective ring 14 of an upper partial protective ring 14a and a lower partial protective ring 14b. In the area of the connection piece 36, the two partial protective rings 14a and 14b overlap one another over a short section in the circumferential direction and are spot-welded on both sides next to the connection piece 36. As an alternative, it is possible to allow the protective ring 14 to pass through in one piece there and to have it snap into the annular groove 40 with an opening provided there, which has a bent, elastic edge.

It is pointed out that the essentially triangular configuration of the device according to FIG. 4 may also be realized with two welded edge pairs 26 and with fixation of the protective ring 14 by means of two sheet metal flaps 32, which are welded in, as was described in connection with FIG. 2.

It is clearly apparent from the above description that the protective ring 14 can be mounted in the correct position in the housing partial shells 4a and 4b and be connected to them in a particularly simple manner. As a consequence of the thermal conductivity of the protective ring 14, the expanding mat 18 reaches a sufficiently high temperature to increase its volume and to hold the protective ring 14 securely even if the housing 4 expands. The protective ring 14, which is reinforced by beads and is welded to the housing 4, does not tend to vibrate. If desired, the protective ring 14 may be welded to the connection piece 36.

The exhaust gas treatment bodies 6 are, e.g., ceramic monoliths with longitudinal canals and a catalytic coating in order to achieve oxidation of the hydrocarbons and carbon monoxide present in the exhaust gas as well as reduction of nitrogen oxides present in the exhaust gas in the device 2. However, the exhaust gas treatment bodies 6 may also be soot particle filters made of ceramic or other materials for diesel engine exhaust gases.

While specific embodiments of the invention have been shown and described in detail to illustrate the application of the principles of the invention, it will be understood that the invention may be embodied otherwise without departing from such principles.

What is claimed is:

1. Device for treating exhaust gases of an internal combustion engine, comprising:
   a housing formed of two partial shells welded together along a first partial shell longitudinal flange and a second partial shell longitudinal flange to form a welded edge pair, said housing having an exhaust intake opening and an exhaust outlet opening defining two open end zones connected to an exhaust gas line, providing a flow passage for the exhaust gas between said end zones;
   two exhaust gas treatment bodies through which exhaust gas flows, said exhaust gas treatment bodies being arranged one behind the other in a flow direction and being arranged at spaced locations from one another in said housing;
   a protective ring formed of sheet metal, said protective ring delimiting a space between the two exhaust gas treatment bodies at an outer side of said two exhaust gas treatment bodies;
   said protective ring including at least one sheet metal flap, which extends between said first partial shell longitudinal flange and said second partial shell longitudinal flange, said sheet metal flap being welded to said housing at said welded edge pair.

2. Device in accordance with claim 1 wherein said sheet metal flap of the protective ring is received in a depression of the welded edge pair.

3. Device in accordance with claim 1 wherein said protective ring includes an area in which no sheet metal flap is provided said area being provided with a plurality of adjacent beads.

4. Device in accordance with claim 1 wherein said protective ring has an essentially triangular cross section with rounded corners.

5. Device in accordance with claim 1, wherein said protective ring includes an additional sheet metal flap, said sheet metal flap and said additional sheet metal flap being provided, at spaced locations in a circumferential direction, said housing further being welded together along a first partial shell additional longitudinal flange and a second partial shell additional longitudinal flange forming an additional welded edge pair, said additional sheet metal flap extending between said first partial shell additional longitudinal flange and said second partial shell additional longitudinal flange, said additional sheet metal flap being welded to said housing at said additional welded edge pair.

6. Device in accordance with claim 5 wherein said sheet metal flap and said additional sheet metal flap of the protective ring are received in a depression of the welded edge pair and a depression of the additional welded edge pair respectively.

7. Device in accordance with claim 5 wherein said protective ring is formed of two partial protective rings joining one another in the circumferential direction, with two partial sheet metal flaps at each of two opposite ends.

8. Device in accordance with claim 7, wherein two partial protective rings are connected, preferably by spot welding, by connecting two partial sheet metal flaps each.

9. Device in accordance with claim 1 wherein said protective ring engages, in a positive-locking manner, a connection piece for a lambda probe, said connection piece extending into the interior of the housing, at a point located at a spaced location from the sheet metal flap in the circumferential direction.

10. Device in accordance with claim 9 wherein said protective ring includes an area in which no sheet metal flap is provided and said protective ring does not engage with said connection piece.

11. Device in accordance with claim 1 wherein said two exhaust gas treatment bodies are held in said housing by a continuous holding mat, and a silicate fabric layer is provided on the inside of the holding mat providing transition zones in which the protective ring is adjacent to the two exhaust gas treatment bodies.

12. Device in accordance with claim 11, wherein said holding mat is an expanding mat.

13. A device according to claim 12, wherein said housing includes a first partial shell additional longitudinal flange and a second partial shell additional longitudinal flange, said protective ring being formed of a first sheet metal ring part including said sheet metal flap and an additional sheet metal flap provided at a spaced location in a circumferential direction and a second sheet metal ring part with a second ring part flap and a second ring part additional flap, said sheet metal flap and said second ring part sheet metal flap being positioned between said first partial shell longitudinal flange and said second partial shell longitudinal flange, said additional sheet metal flap and said second ring part additional sheet metal flap being positioned between said first partial shell additional longitudinal flange and said second partial shell additional longitudinal flange.

14. A device according to claim 13, wherein said first partial shell longitudinal flange and said second partial shell longitudinal flange are shaped to form depressions for receiving said sheet metal flap and said second ring portion sheet metal flap, said first partial shell additional longitudinal flange and said second partial shell additional longitudinal flange being shaped forming depressions for receiving said additional sheet metal flap and said second ring portion additional sheet metal flap.

15. A device for treating exhaust gases of an internal combustion engine, comprising: a housing formed of two partial shells welded together along a first partial shell longitudinal flange and a second partial shell longitudinal flange to form an exhaust gas intake opening and an exhaust gas outlet opening providing a flow passage for exhaust gas; two exhaust gas treatment bodies through which exhaust gas flows, said exhaust gas treatment bodies being arranged one behind the other in a longitudinal direction and being arranged at spaced locations from one another in said housing; a protective ring formed of sheet metal, said protective ring delimiting a space between said two exhaust gas treatment bodies at an outer side of said two exhaust gas treatment bodies, said protective ring including a sheet metal flap extending between said first partial shell longitudinal flange and said second partial shell longitudinal flange, said sheet metal flap being welded to said housing.

16. A device according to claim 12, wherein one of said first partial shell longitudinal flange and said second partial shell longitudinal flange are shaped to form a depression providing a space between said first partial shell longitudinal flange and said second partial shell longitudinal flange for receiving said sheet metal flap.

* * * * *